United States Patent [19]
Howard

[11] 3,799,727
[45] Mar. 26, 1974

[54] HEAT CONTROL FOR FABRIC MOLDING
[75] Inventor: Jack E. Howard, Los Angeles, Calif.
[73] Assignee: International Fabric Molders Inc., Los Angeles, Calif.
[22] Filed: May 18, 1972
[21] Appl. No.: 254,494

[52] U.S. Cl................ 425/394, 425/151, 425/383, 425/397, 425/398, 425/406
[51] Int. Cl. ............................................ B29c 17/02
[58] Field of Search .......... 425/394, 397, 383, 388, 425/384, 398, 151, 406, 407

[56] References Cited
UNITED STATES PATENTS

| | | | |
|---|---|---|---|
| 3,025,566 | 3/1962 | Kostur | 425/397 X |
| 2,976,658 | 3/1961 | Kostur | 425/167 |
| 3,167,816 | 2/1965 | Howard et al. | 425/394 X |
| 3,186,034 | 6/1965 | Taylor, Jr. | 425/394 |
| 2,569,856 | 10/1951 | Hill | 425/397 X |
| 2,166,215 | 7/1939 | Lloyd | 425/394 X |
| 2,521,388 | 9/1950 | Maynard et al. | 425/397 X |
| 3,398,434 | 8/1968 | Olesi, Jr. et al. | 425/109 |
| 3,341,893 | 9/1967 | Edwards | 425/397 X |
| 3,561,057 | 2/1971 | Butzko | 425/397 X |

*Primary Examiner*—Robert L. Spicer, Jr.
*Attorney, Agent, or Firm*—Robert C. Comstock

[57] ABSTRACT

A heat control structure for use in fabric molding. A heater rack is mounted for sliding horizontal movement to heat both sides of the fabric simultaneously for molding in unheated molds. The heating rods adjacent to outer areas of the rack are disposed closer together than those in the inner areas to compensate for heat dissipation. Separate heat controls are provided for opposite sides of the fabric and for the inner and outer areas of the fabric.

5 Claims, 3 Drawing Figures

PATENTED MAR 26 1974　　　　　　　　　　　　3,799,727

3,799,727

HEAT CONTROL FOR FABRIC MOLDING

BACKGROUND OF THE INVENTION

1. Field of the Invention

The invention relates to a heat control structure which is particularly adapted for use in molding flat pieces of fabric into three dimensional shapes for use in breast cups, brassieres, swim suits and other garments or parts thereof.

2. Description of the Prior Art

The invention relates particularly to fabric molding operations in which only the fabric is heated rather than the molds. In the prior art, such as U.S. Pat. No. 3,167,816, only one side of the fabric is heated. This may be satisfactory for certain types of fabrics and in operations where only one or a small number of layers of material are being molded in each molding operation. Other types of fabric require more heating, as do operations in which a comparatively large number of similar or diverse fabrics are molded simultaneously.

The prior art also teaches the application of the same amount of heat across the entire area of the fabric. This may result in overheating the interior area, due to the dissipation of heat along the side edges.

SUMMARY OF THE INVENTION

The present invention provides heat control for fabric molding in which heat is applied to both sides of the fabric simultaneously. The application of heat may be controlled so that unequal amounts of heat may be applied to the opposite sides of the fabric, as may be necessary or desirable for various types of molding and/or laminating operations.

The invention also provides for the controlled application of unequal amounts of heat to the interior and exterior portions of the fabric in order to compensate for the dissipation of heat which naturally occurs along the side edges. The unequal application of heat accordingly results in the necessary and desirable uniform heating across the entire surface of the material, to provide uniform molding results.

It is accordingly among the objects of the invention to provide a heating structure and control means for use in fabric molding which provides all of the advantages and benefits set forth above and described in detail hereinafter in this specification.

The invention teaches the use of a heater rack having upper and lower portions which are moved horizontally into positions directly above and below the fabric. After the fabric is heated, the heating rack is withdrawn, followed by immediate closing of the molds. Means are provided for preventing the molds from closing until the heating means are withdrawn and for preventing return movement of the heating means until the molds are opened.

The invention also comprises such other objects, advantages and capabilities as will later more fully appear and which are inherently possessed by the invention.

While there are shown in the accompanying drawings preferred embodiments of the invention, it should be understood that the same are susceptible of modification and change without departing from the spirit of the invention.

DESCRIPTION OF THE PREFERRED EMBODIMENT

Figure 1:
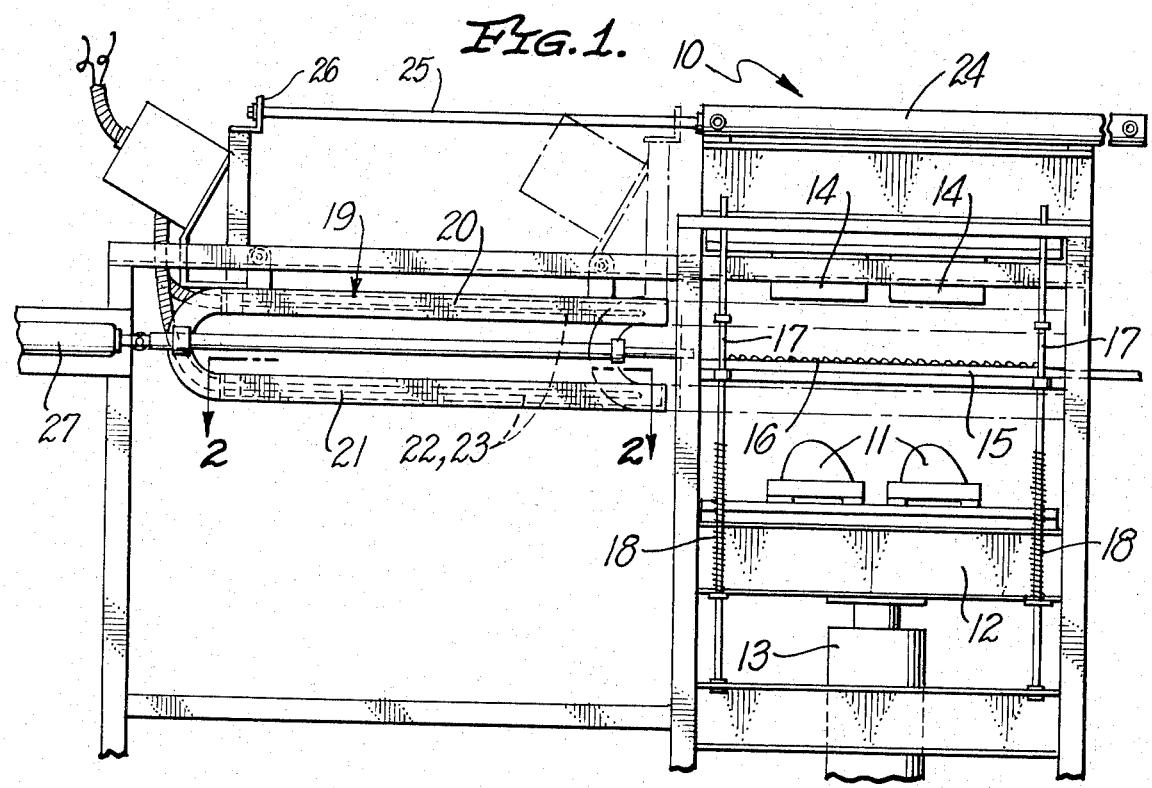
FIG. 1 is a side elevational view of a molding press with heating rack in retracted position, the operating position being shown in phantom lines.

A preferred embodiment which has been selected to illustrate the invention comprises a conventional hydraulic press 10. A plurality of male molds 11 are mounted on a support member 12 which is mounted for vertical reciprocal movement by a hydraulic ram 13, which has an upper end of its piston connected to the support member 12.

A plurality of complementary stationary female molds 14 are mounted directly above the male molds 11. A fabric frame 15 extends horizontally between the molds 11 and 14 and is adapted to hold one or more linings of fabric 16 for molding. The frame 15 is mounted for vertical reciprocal movement on guide rods 17. Coil springs 18 mounted on the guide rods 17 exert pressure urging the frame 15 and fabric 16 upwardly when the molds are closed.

A substantially U-shaped heater rack 19 is mounted for sliding reciprocal horizontal movement between two positions, in one of which its upper portion 20 and lower portion 21 are disposed directly above and beneath the fabric 16 and extend substantially parallel thereto. This is the heating or operating position, in which heat is applied to the fabric 16 to prepare it for the molding operation.

The heater rack 19 is moved from this position to a retracted or non-operating position in which it is slidably moved horizontally outwardly so that the molds can be closed to perform the molding operation after the fabric 16 has been sufficiently heated.

Figure 2:
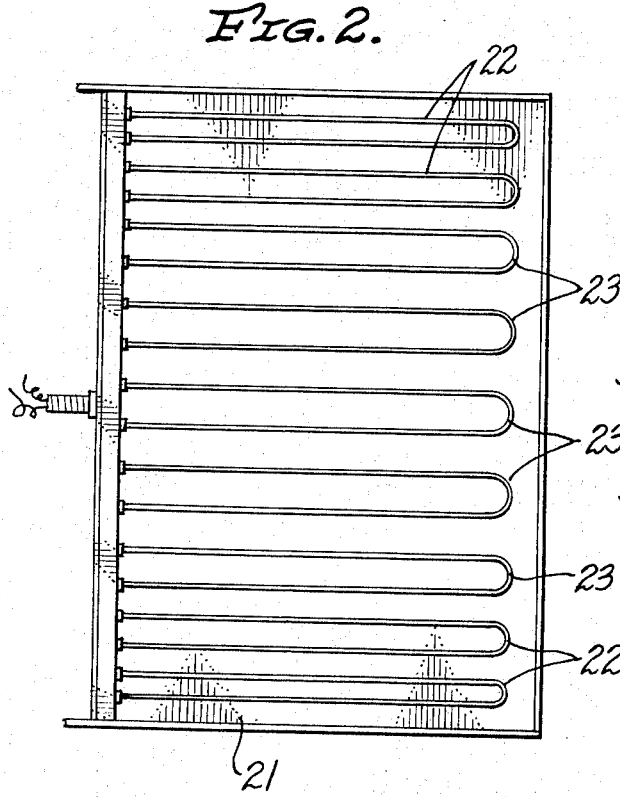
FIG. 2 is a sectional view on line 2—2.
Figure 3:
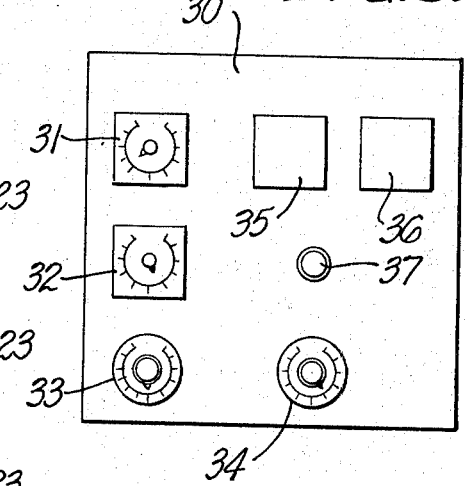
FIG. 3 is a front elevational view of the control panel.

The upper portion 20 and lower portion 21 of the heater rack 19 have a plurality of electrically operated U-shaped heating rods, which are best shown in FIG. 2 of the drawings. These rods comprise narrow rods 22, two of which are disposed adjacent to each end of the heater rack 19 and wider rods 23, which extend across the inner portion of the heater rack 19. All of the rods are spaced from and extend parallel to each other. As shown in FIG. 2 of the drawings, the inner rods 22 are wider than the outer rods 22, to provide progressively wider spacing of the heating rods from the side edges of the heater rack 19 to the inner portion thereof.

The purpose of the heater rod arrangement shown is to provide a greater amount of heat adjacent to the side edges of the heater rack 19 in order to compensate for heat dissipation which naturally occurs in these areas. This arrangement prevents the interior areas of the fabric 16, which have little or no heat dissipation, from being undesirably over heated prior to the molding operation.

Reciprocal movement of the heater rack 19 is effected by the operation of a hydraulic cylinder 24, which is mounted on the upper part of the press 10. The end of its piston 25 is connected to a vertically directed arm 26 which is in turn connected to the heater rack 19. A shock absorber 27 is provided to cushion the movement of the heater rack 19.

In use, the fabric materials 16 to be heated are placed on the fabric frame 15. The cylinder 24 is then energized to move the heater rack 19 to its operating position. Heat is then applied to the heating rods 22 and 23 and transferred by radiation to the fabric 16. After the fabric 16 has been sufficiently heated, the heater rack 19 is retracted and the hydraulic ram 13 energized to move the support member 12 and male molds 11 upwardly. The male molds 11 engage the fabric 16 as they move upwardly and carry the fabric 16 and frame 15 upwardly so that the fabric 16 is held between the closed molds.

The molds remain closed a short period of time while the molding operation is completed. The ram 13 is then released to retract its piston and thereby move the support member 12 and male molds 11 back down to their normal positions. The frame 15 moves back to its normal position and the molded fabric 16 is then removed from the frame 15.

Suitable micro-switches are provided to prevent the ram 13 from operating until the heater rack 19 is in its fully retracted position and to prevent the heater rack 19 from moving to operating position until the molds are fully open.

The intensity and duration of heat which is applied to the fabric 16 is controlled by means of an electrical control panel 30. The control panel 30 includes a control 31 for controlling the amount of heat which is supplied to the upper portion 20 of the heater rack 19. A separate control 32 controls the amount of heat supplied to the lower portion 21 of the heater rack 19. A control 33 controls the amount of heat supplied to the outer heating rods 22. A separate control 34 controls the amount of heat applied to the inner heating rods 23.

A timing control 35 controls the amount of time the heating rack 19 is held in operating position applying heat to the fabric 16. A second timing control 37 controls the amount of time the molds are held closed to mold the fabric 16. An indicator light 37 is also provided.

I claim:

1. In a molding press for use in molding flat pieces of fabric into three dimensional shapes for use in garments, in which a plurality of unheated mold parts are mounted for vertical movement into a closed position with complementary unheated mold parts to mold one or more layers of fabric disposed between said mold parts, the improvement comprising a heater rack adapted to heat both sides of said fabric simultaneously, said heater rack being mounted for sliding horizontal movement between an operating position and a retracted position, said heating rack having an upper portion and a lower portion, said upper portion being disposed directly above said fabric and extending parallel thereto and said lower portion being disposed directly below said fabric and extending parallel thereto when said heater rack is in operating position, said heater rack in retracted position being moved horizontally completely away from said fabric to permit said mold parts to close and mold said fabric, each of said upper and lower portions of said heating rack having a plurality of elongated parallel heating rods extending longitudinally thereacross, said rods comprising a plurality of narrow rods disposed adjacent to each of the opposite side edges of said rack and a plurality of wider rods extending across the inner portion of the rack between said narrow rods, whereby more heat is provided along the side edges of said rack to compensate for increased heat dissipation along the sides of said rack and fabric, to thereby provide uniform heating and molding across the entire area of said fabric.

2. The structure described in claim 1, said rods being of progressively wider configuration from the side edges of said rack to the inner portion thereof.

3. The structure described in claim 1, and separate control means for controlling the heat supply to the outer and inner areas of said rack to provide uniform heating and molding across the entire area of said fabric.

4. The structure described in claim 1, and separate control means for controlling the heat supply to the upper and lower portions of said rack to provide differential heating of the upper and lower layers of multiple layers of fabric disposed upon said rack.

5. The structure described in claim 3, and separate control means for controlling the heat supply to the upper and lower portions of said rack to provide differential heating of the upper and lower layers of multiple layers of fabric disposed upon said rack.

* * * * *